United States Patent
Zhang et al.

(10) Patent No.: US 11,048,409 B2
(45) Date of Patent: Jun. 29, 2021

(54) METHOD AND APPARATUS FOR EXECUTING FUNCTION OF FIXED VIRTUAL KEYS OF MOBILE TERMINAL WITH A SINGLE HAND, AND MOBILE TERMINAL

(71) Applicant: GREE ELECTRIC APPLIANCES, INC. OF ZHUHAI, Zhuhai (CN)

(72) Inventors: Long Zhang, Zhuhai (CN); Qianshan Ren, Zhuhai (CN)

(73) Assignee: GREE ELECTRIC APPLIANCES, INC. OF ZHUHAI, Zhuhai (CN)

(*) Notice: Subject to any disclaimer, the term of this patent is extended or adjusted under 35 U.S.C. 154(b) by 0 days.

(21) Appl. No.: 16/077,919

(22) PCT Filed: Sep. 27, 2016

(86) PCT No.: PCT/CN2016/100262
§ 371 (c)(1),
(2) Date: Aug. 14, 2018

(87) PCT Pub. No.: WO2017/143775
PCT Pub. Date: Aug. 31, 2017

(65) Prior Publication Data
US 2019/0079669 A1 Mar. 14, 2019

(30) Foreign Application Priority Data
Feb. 25, 2016 (CN) .......................... 201610105364.5

(51) Int. Cl.
*G06F 3/0481* (2013.01)
*G06F 3/0484* (2013.01)
*G06F 3/0488* (2013.01)

(52) U.S. Cl.
CPC ........ *G06F 3/04886* (2013.01); *G06F 3/0484* (2013.01); *G06F 3/0488* (2013.01);
(Continued)

(58) Field of Classification Search
CPC .. G06F 3/04812; G06F 3/0484; G06F 3/0488; G06F 3/04886
See application file for complete search history.

(56) References Cited

U.S. PATENT DOCUMENTS

2009/0122022 A1* 5/2009 Park ...................... G06F 3/0488
345/173
2009/0160805 A1 6/2009 Hosokawa et al.
(Continued)

FOREIGN PATENT DOCUMENTS

CN  102890615 A  1/2013
CN  102929535 A  2/2013
(Continued)

OTHER PUBLICATIONS

International Search Report for International Patent Applicaion No. PCT/CN2016/100262, dated Dec. 28, 2016, 2 pages.
(Continued)

*Primary Examiner* — Ryan A Lubit
(74) *Attorney, Agent, or Firm* — Armstrong Teasdale LLP

(57) ABSTRACT

Disclosed in the disclosure are a method and apparatus for controlling mobile terminal, and a mobile terminal. The method includes: detecting an operation that a user finger clicks a touch screen; in a case that the operation that the user finger clicks the touch screen in a preset time reaches to a preset time, controlling the touch screen to display a preset quantity of dynamic virtual keys in a preset area, the preset area being an area within a preset range taking a clicking position of the user finger as a center, and the dynamic virtual keys including basic dynamic virtual keys corresponding to functional operations of fixed virtual keys; and detecting and responding to an operation that the user finger clicks the dynamic virtual keys and executing functional operations corresponding to the dynamic virtual key.

11 Claims, 2 Drawing Sheets

(52) U.S. Cl.
  CPC ...... *G06F 3/04812* (2013.01); *G06F 3/04817* (2013.01); *G06F 3/04883* (2013.01)

(56) References Cited

U.S. PATENT DOCUMENTS

| | | | |
|---|---|---|---|
| 2011/0004835 A1* | 1/2011 | Yanchar | G06Q 10/109 715/763 |
| 2011/0090151 A1* | 4/2011 | Huang | G06F 3/0237 345/168 |
| 2012/0056817 A1 | 3/2012 | Griffin et al. | |
| 2015/0007308 A1* | 1/2015 | Mankowski | G06F 3/017 726/19 |

FOREIGN PATENT DOCUMENTS

| | | |
|---|---|---|
| CN | 102929556 A | 2/2013 |
| CN | 103092362 A | 5/2013 |
| CN | 103809888 A | 5/2014 |
| CN | 104679436 A | 6/2015 |
| CN | 104731481 A | 6/2015 |
| CN | 105786347 A | 7/2016 |

OTHER PUBLICATIONS

European Search Report for European Patent Application No. EP 16891223, dated Oct. 16, 2019, 8 pages.

\* cited by examiner

METHOD AND APPARATUS FOR EXECUTING FUNCTION OF FIXED VIRTUAL KEYS OF MOBILE TERMINAL WITH A SINGLE HAND, AND MOBILE TERMINAL

The present application is the national stage entry of International Patent Application No. PCT/CN2016/100262, filed on Aug. 27, 2016, and entitled "Mobile terminal control method, device, and mobile terminal," which claims the benefit of priority to Chinese Patent Application No. 201610105364.5, filed on Feb. 25, 2016, and entitled "Method and Apparatus for Controlling Mobile Terminal, and Mobile Terminal", the entire contents of which are hereby incorporated by reference.

TECHNICAL FIELD

The embodiments of the disclosure relate to the technical field of electronics, and more particularly, to a method and apparatus for controlling mobile terminal control, and a mobile terminal.

BACKGROUND

At present, a mobile terminal is widely applied and almost everyone has one mobile terminal. Moreover, a mobile terminal with a touch screen has become a mainstream and is favored by people. With respect to the mobile terminal with the touch screen, besides a power button and a volume adjustment button, there is no longer other physical buttons generally; meanwhile, in a fixed area of the touch screen, such as a lower portion of the touch screen, one or more virtual keys with fixed positions are displayed. The virtual keys are generally corresponding to specific functional operations, for example, returning to a main interface via one key, returning or switching a multifunctional operation task. When a user operates the mobile terminal, it is frequent to touch the virtual keys, thereby implementing the corresponding functional operations.

While the screen of the mobile terminal becomes larger, when the user operates the mobile terminal with a single hand, a finger sometimes is inconvenient to touch the virtual keys arranged in the fixed area of the touch screen; and as a result, the user experience is relatively poor.

SUMMARY

The embodiments of the disclosure provide the following technical solutions.

A method for controlling mobile terminal is applied to a mobile terminal with a touch screen, which includes:

an operation that a user finger clicks a touch screen is detected;

in a case that the operation that the user finger clicks the touch screen in a preset time reaches to a preset times, the touch screen is controlled to display a preset quantity of dynamic virtual keys in a preset area, the preset area being an area within a preset range taking a clicking position of the user finger as a center, and the preset quantity of dynamic virtual keys including basic dynamic virtual keys corresponding to functional operations of fixed virtual keys;

an operation that the user finger clicks the dynamic virtual keys is detected; and the operation that the user finger clicks the dynamic virtual keys is responded, and functional operations corresponding to the dynamic virtual keys are executed.

In at least one alternative embodiment, before the step that in a case that the operation that the user finger clicks the touch screen in the preset time reaches to the preset times, the touch screen is controlled to display the preset quantity of dynamic virtual keys in the preset area, the method further includes:

the dynamic virtual keys and functional operations corresponding to the dynamic virtual keys are set.

In at least one alternative embodiment, before the step that in a case that the operation that the user finger clicks the touch screen in the preset time reaches to the preset times, the touch screen is controlled to display the preset quantity of dynamic virtual keys in the preset area, the method further includes:

a size of the preset area is set.

In at least one alternative embodiment, the method further includes:

in a case that the time that the user finger clicks the dynamic virtual keys is detected to reach a first preset time, each of the dynamic virtual keys is controlled to enter a movable state;

a first operation that the user finger moves the dynamic virtual keys on the touch screen is obtained, the first operation is responded, and the dynamic virtual keys are moved;

in a case that the time that the user finger clicks the dynamic virtual keys is detected to reach a second preset time, the preset quantity of dynamic virtual keys is controlled to simultaneously enter the movable state, the second preset time being greater than the first preset time; and a second operation that the user finger simultaneously moves the preset quantity of dynamic virtual keys on the touch screen is obtained, the second operation is responded and the preset quantity of dynamic virtual keys are simultaneously moved.

In at least one alternative embodiment, the preset quantity of dynamic virtual keys further includes:

a customized dynamic virtual key corresponding to a functional operation customized by the user.

An apparatus for controlling mobile terminal is applied to a mobile terminal with a touch screen, which includes:

a first detection component, configured to detect an operation that a user finger clicks a touch screen;

a first control component, configured to control the touch screen to display a preset quantity of dynamic virtual keys in a preset area in a case that the operation that the user finger clicks the touch screen in a preset time reaches to a preset times, the preset area being an area within a preset range taking a clicking position of the user finger as a center, and the preset quantity of dynamic virtual keys including basic dynamic virtual keys corresponding to functional operations of fixed virtual keys;

a second detection component, configured to detect an operation that the user finger clicks the dynamic virtual keys; and a second control component, configured to respond to the operation that the user finger clicks the dynamic virtual keys and execute functional operations corresponding to the dynamic virtual keys.

In at least one alternative embodiment, the apparatus further includes: a first setting component, configured to set the dynamic virtual keys and functional operations corresponding to the dynamic virtual keys.

In at least one alternative embodiment, the apparatus further includes:

a second setting component, configured to set a size of the preset area.

In at least one alternative embodiment, the apparatus further includes:

a first control component, configured to control each of the dynamic virtual keys to enter a movable state in a case that the time that the user finger clicks the dynamic virtual keys is detected to reach a first preset time;

a first response component, configured to obtain a first operation that the user finger moves the dynamic virtual keys on the touch screen, respond to the first operation and move the dynamic virtual keys;

a second control component, configured to control the preset quantity of dynamic virtual keys to simultaneously enter the movable state in a case that the time that the user finger clicks the dynamic virtual keys is detected to reach a second preset time, the second preset time being greater than the first preset time; and a second response component, configured to obtain a second operation that the user finger simultaneously moves the preset quantity of dynamic virtual keys on the touch screen, respond to the second operation and simultaneously move the preset quantity of dynamic virtual keys.

In at least one alternative embodiment, the preset quantity of dynamic virtual keys displayed by the touch screen controlled by the second control component in the preset area further includes:

a customized dynamic virtual key corresponding to a functional operation customized by the user.

A mobile terminal includes:

a processor and a touch screen;

operations of the processor includes: detecting an operation that a user finger clicks a touch screen; in a case that the operation that the user finger clicks the touch screen in a preset time reaches to a preset times, controlling the touch screen to display a preset quantity of dynamic virtual keys in a preset area, the preset area being an area within a preset range taking a clicking position of the user finger as a center, and the preset quantity of dynamic virtual keys including basic dynamic virtual keys corresponding to functional operations of fixed virtual keys; detecting an operation that the user finger clicks the dynamic virtual keys; and responding to the operation that the user finger clicks the dynamic virtual keys and executing functional operations corresponding to the dynamic virtual keys.

BRIEF DESCRIPTION OF THE DRAWINGS

In order to describe the technical solutions in the embodiments or in the conventional art of the disclosure more clearly, the drawings required to be used in descriptions about the embodiments will be simply introduced below. Obviously, the drawings in the following descriptions are only some embodiments of the disclosure. Those of ordinary skilled in the art may further obtain other drawings according to these drawings without creative work.

DETAILED DESCRIPTION OF THE EMBODIMENTS

The following clearly and completely describes the technical solutions in the embodiments of the disclosure with reference to the accompanying drawings in the embodiments of the disclosure. Apparently, the described embodiments are a part rather than all of the embodiments of the disclosure. All other embodiments obtained by a person of ordinary skill in the art based on the embodiments of the disclosure without creative efforts shall fall within the protection scope of the disclosure.

In order to make the purpose, technical solutions and advantages of the disclosure clearer, implementation modes of the disclosure will further be described below in combination with the drawings in detail.

Embodiment

Figure 1:
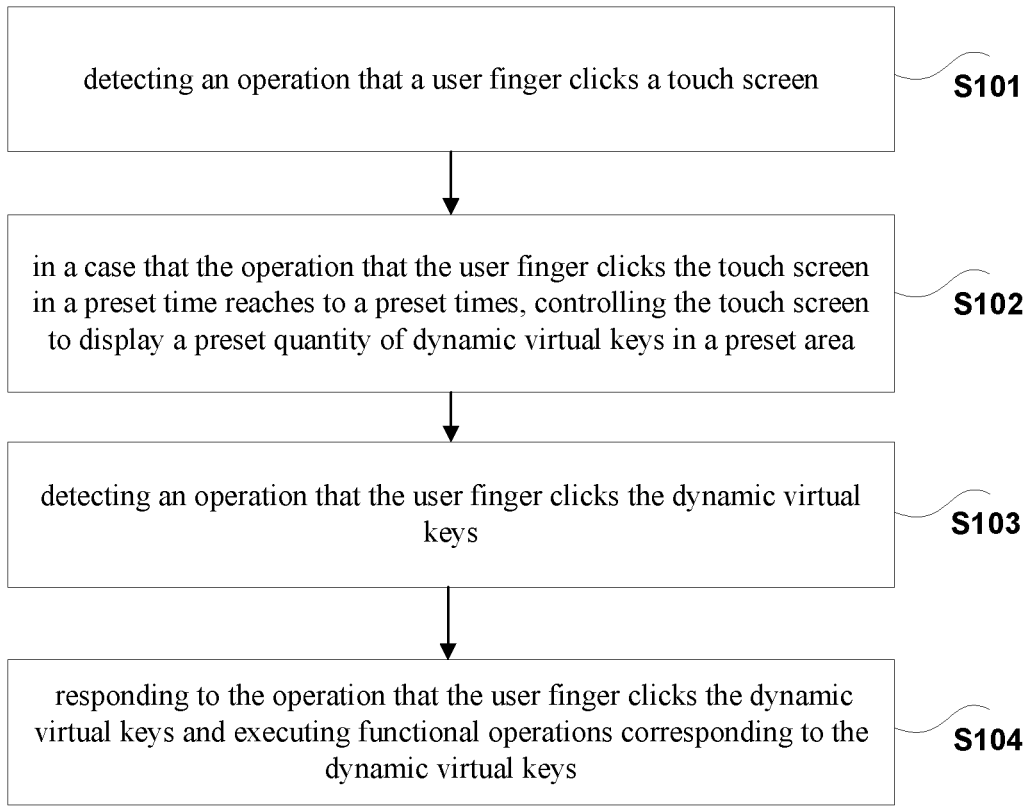
FIG. 1 is a flowchart of a method for controlling mobile terminal provided by an embodiment of the disclosure.
Figure 3:
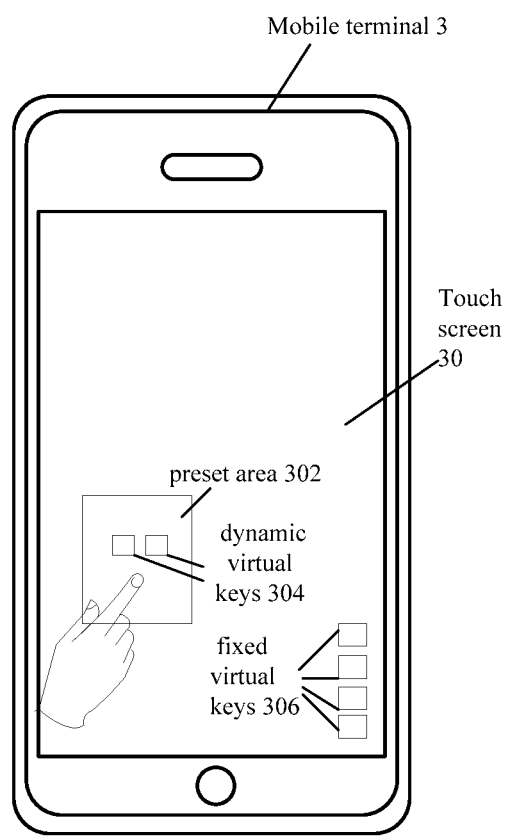
FIG. 3 is a simplified diagram of an example mobile terminal with a touch screen provided by an embodiment of the disclosure.

Referring to FIG. 1, a flowchart of a method for controlling mobile terminal provided by an embodiment of the disclosure is shown in FIG. 1. The method for controlling mobile terminal provided by this embodiment of the disclosure is applied to a mobile terminal 1 with a touch screen 30 which is shown in FIG. 3. As shown in FIG. 1, the method includes the following steps.

At Step S101, an operation that a user finger clicks a touch screen is detected.

At Step S102, in a case that the operation that the user finger clicks the touch screen in a preset time reaches to a preset times, as shown in FIG. 3, the touch screen 30 is controlled to display a preset quantity of dynamic virtual keys in a preset area.

Specifically, the preset time should be relatively small, optionally, not greater than 2 s.

Specifically, the preset times should be relatively small so as to avoid troublesome operation. Optionally, the preset times is greater than 1 times and is not greater than three times, and preferably is two times.

Specifically, as shown in FIG. 3, the preset area is an area within a preset range taking a clicking position of the user finger as a center on the touch screen.

Optionally, the preset range should be a range suitable for the operation of the user finger, that is, the dynamic virtual keys 304 displayed in the preset area 302 of the touch screen should be conveniently touched by the user finger. Specifically, the preset range may be a circular range with the clicking position of the user finger as a circle center, and also may be a rectangular range or a range with other forms with the clicking position of the user finger as a circle center.

Optionally, the dynamic virtual keys are uniformly distributed in the preset area.

Specifically, the preset quantity of dynamic virtual keys 304 includes basic dynamic virtual keys corresponding to functional operations of fixed virtual keys 306. The fixed virtual keys refer to virtual keys arranged in a fixed area of the touch screen, such as a fixed virtual key for characterizing to return to an operation of a main interface via one key, a fixed virtual key for characterizing a return operation or a fixed virtual key for characterizing a switching operation of a multifunctional operation task. The action of the fixed virtual key for characterizing the switching operation of the multifunctional operation task specifically is as follows: when multiple applications (software) are run at a background of the mobile terminal, touching the key may switch to applications (software) running on the main interface.

At Step S103, an operation that the user finger clicks the dynamic virtual keys is to detected.

At Step S104, the operation that the user finger clicks the dynamic virtual keys is responded, and functional operations corresponding to the dynamic virtual keys are executed.

According to the technical solutions of the disclosure, in a case that the operation that the user finger clicks the touch screen in the preset time reaches to the preset times, the touch screen is controlled to display the preset quantity of dynamic virtual keys in the preset area and then the operation that the user finger clicks the dynamic virtual keys is detected; since the preset area is the area within the preset range taking the clicking position of the user finger as the center, it can be touched by the user very easily and is relatively convenient; then, the operation that the user finger clicks the dynamic virtual keys is responded and the functional operations corresponding to the dynamic virtual keys are executed; since the preset quantity of dynamic virtual keys includes the basic dynamic virtual keys corresponding to the functional operations of the fixed virtual keys, the effect of clicking the fixed virtual keys can be implemented by enabling the user to click the basic dynamic virtual keys, which is very convenient. Therefore, when the user uses a large-screen mobile terminal, in a case that a finger is not convenient to touch the fixed virtual keys in a fixed area of the mobile terminal, by applying the technical solutions provided by the disclosure, the functional operations same as the touch of the fixed virtual keys can be implemented very easily by touching the dynamic virtual keys, and thus the user experience of the user is well improved.

According to a method for controlling mobile terminal provided by another embodiment of the disclosure, optionally, it further includes the following step before the step S102.

The dynamic virtual keys and functional operations corresponding to the dynamic virtual keys are set.

Specifically, the step that the dynamic virtual keys and the functional operations corresponding to the dynamic virtual keys are set includes the followings.

The basic dynamic virtual keys and functional operations corresponding to the basic dynamic virtual keys are set.

Optionally, according to the method for controlling mobile terminal provided by another embodiment of the disclosure, the preset quantity of dynamic virtual keys further includes:

a customized dynamic virtual key corresponding to a functional operation customized by the user.

The step that the dynamic virtual keys and the functional operations corresponding to the dynamic virtual keys are set further includes the followings.

The customized dynamic virtual key and a functional operation corresponding to the customized dynamic virtual key are set. Optionally, the customized dynamic virtual key may be customized as a remote control virtual key, an alarm clock virtual key, a mute virtual key or an audio playing virtual key, etc.

Specifically, by arranging the customized dynamic virtual key corresponding to the functional operation customized by the user, the convenience that the user uses the mobile terminal can further be improved. When the user selects a customized functional operation (such as opening an alarm clock interface), only the customized dynamic virtual key (such as an alarm clock key) needs to be clicked and an alarm clock icon does not need to be found via a multi-step operation. Therefore, the method is more convenient and can further improve the user experience.

According to the method for controlling mobile terminal provided by another embodiment of the disclosure, optionally, it further includes the following step before the step S102.

A size of the preset area is set.

Optionally, the method for controlling mobile terminal provided by another embodiment of the disclosure further includes the following steps.

In a case that the time that the user finger clicks the dynamic virtual keys is detected to reach a first preset time, each of the dynamic virtual keys is controlled to enter a movable state.

A first operation that the user finger moves the dynamic virtual keys on the touch screen is obtained, the first operation is responded, and the dynamic virtual keys are moved.

In a case that the time that the user finger clicks the dynamic virtual keys is detected to reach a second preset time, the preset quantity of dynamic virtual keys is controlled to simultaneously enter the movable state.

Optionally, the second preset time being greater than the first preset time.

A second operation that the user finger simultaneously moves the preset quantity of dynamic virtual keys on the touch screen is obtained, the second operation is responded and the preset quantity of dynamic virtual keys is simultaneously moved.

Optionally, during the process when the preset quantity of dynamic virtual keys is moved, a relative positional relationship among the dynamic virtual keys keeps unchanged.

Specifically, through the technical solutions of this embodiment, the user can move positions of these dynamic virtual keys on the touch screen, thereby being convenient for the user to move the dynamic virtual keys to positions more conveniently touched by the finger and being more convenient. Therefore, the user experience can be further improved.

In order to elaborate the technical solutions provided by the disclosure more comprehensively, the disclosure discloses an apparatus for controlling mobile terminal corresponding to the method for controlling mobile terminal provided by this embodiment of the disclosure.

Figure 2:
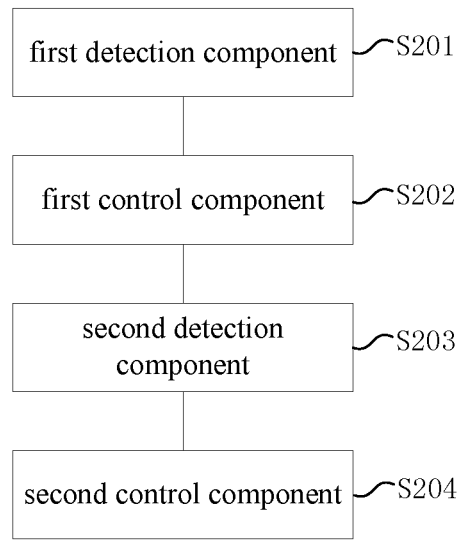
FIG. 2 is a structural diagram of an apparatus for controlling mobile terminal provided by an embodiment of the disclosure.

Referring to FIG. 2, a structure diagram of an apparatus for controlling mobile terminal provided by an embodiment of the disclosure is shown in FIG. 2. The apparatus for controlling mobile terminal provided by this embodiment of the disclosure is applied to a mobile terminal with a touch screen. As shown in FIG. 2, the apparatus includes:

a first detection component 201, configured to detect an operation that a user finger clicks a touch screen;

a first control component 202, configured to control the touch screen to display a preset quantity of dynamic virtual keys in a preset area in a case that the operation that the user finger clicks the touch screen in a preset time reaches to a preset times, the preset area being an area within a preset range taking a clicking position of the user finger as a center, and the preset quantity of dynamic virtual keys including basic dynamic virtual keys corresponding to functional operations of fixed virtual keys;

a second detection component 203, configured to detect an operation that the user finger clicks the dynamic virtual keys; and a second control component 204, configured to respond to the operation that the user finger clicks the dynamic virtual keys and execute functional operations corresponding to the dynamic virtual keys.

By applying the apparatus for controlling mobile terminal provided by this embodiment of the disclosure, when the user uses a large-screen mobile terminal, in a case that a finger is not convenient to touch the fixed virtual keys in a fixed area of the mobile terminal, by applying the technical solutions provided by the disclosure, the functional operations same as the touch of the fixed virtual keys can be implemented very easily by touching the dynamic virtual keys, and thus the user experience of the user is well improved.

Optionally, a mobile terminal control device provided by another embodiment of the disclosure further includes:

a first setting component, configured to set the dynamic virtual keys and functional operations corresponding to the dynamic virtual keys.

Optionally, a mobile terminal control device provided by another embodiment of the disclosure further includes:

a second setting component, configured to set a size of the preset area.

Optionally, a mobile terminal control device provided by another embodiment of the disclosure further includes:

a first control component, configured to control each of the dynamic virtual keys to enter a movable state in a case that the time that the user finger clicks the dynamic virtual keys is detected to reach a first preset time;

a first response component, configured to obtain a first operation that the user finger moves the dynamic virtual keys on the touch screen, respond to the first operation and move the dynamic virtual keys;

a second control component, configured to control the preset quantity of dynamic virtual keys to simultaneously enter the movable state in a case that the time that the user finger clicks the dynamic virtual keys is detected to reach a second preset time, the second preset time being greater than the first preset time; and a second response component, configured to obtain a second operation that the user finger simultaneously moves the preset quantity of dynamic virtual keys on the touch screen, respond to the second operation and simultaneously move the preset quantity of dynamic virtual keys.

Optionally, according to the apparatus for controlling mobile terminal provided by another embodiment of the disclosure, the preset quantity of dynamic virtual keys displayed by the touch screen controlled by the second control component in the preset area further includes:

a customized dynamic virtual key corresponding to a functional operation customized by the user.

In order to elaborate the technical solutions provided by the disclosure more comprehensively, the disclosure further discloses a mobile terminal.

The mobile terminal provided by this embodiment of the disclosure includes:

a processor and a touch screen;

operations of the processor includes: detecting an operation that a user finger clicks a touch screen; in a case that the operation that the user finger clicks the touch screen in a preset time reaches to a preset times, controlling the touch screen to display a preset quantity of dynamic virtual keys in a preset area, the preset area being an area within a preset range taking a clicking position of the user finger as a center, and the preset quantity of dynamic virtual keys including basic dynamic virtual keys corresponding to functional operations of fixed virtual keys; detecting an operation that the user finger clicks the dynamic virtual keys; and responding to the operation that the user finger clicks the dynamic virtual keys and executing functional operations corresponding to the dynamic virtual keys.

Optionally, according to a mobile terminal provided by another embodiment of the disclosure, the operation of the processor further includes:

setting the dynamic virtual keys and functional operations corresponding to the dynamic virtual keys.

Optionally, according to the mobile terminal provided by another embodiment of the disclosure, the operation of the processor further includes:

setting a size of the preset area.

Optionally, according to the mobile terminal provided by another embodiment of the disclosure, the operation of the processor further includes:

in a case that the time that the user finger clicks the dynamic virtual keys is detected to reach a first preset time, controlling each of the dynamic virtual keys to enter a movable state;

obtaining a first operation that the user finger moves the dynamic virtual keys on the touch screen, responding to the first operation, and moving the dynamic virtual keys;

in a case that the time that the user finger clicks the dynamic virtual keys is detected to reach a second preset time, controlling the preset quantity of dynamic virtual keys to simultaneously enter the movable state, the second preset time being greater than the first preset time; and obtaining a second operation that the user finger simultaneously moves the preset quantity of dynamic virtual keys on the touch screen, responding to the second operation and simultaneously moving the preset quantity of dynamic virtual keys.

Through the above technical solutions, compared with the conventional art, the disclosure provides the method and apparatus for controlling mobile terminal, and the mobile terminal, the mobile terminal including the touch screen. According to the technical solutions of the disclosure, in a case that the operation that the user finger clicks the touch screen in the preset time reaches to the preset times, the touch screen is controlled to display the preset quantity of dynamic virtual keys in the preset area and then the operation that the user finger clicks the dynamic virtual keys is detected; since the preset area is the area within the preset range taking the clicking position of the user finger as the center, it can be touched by the user very easily and is relatively convenient; then, the operation that the user finger clicks the dynamic virtual keys is responded and the functional operations corresponding to the dynamic virtual keys are executed; since the preset quantity of dynamic virtual keys includes the basic dynamic virtual keys corresponding to the functional operations of the fixed virtual keys, the effect of clicking the fixed virtual keys can be implemented by enabling the user to click the basic dynamic virtual keys, being very convenient. Therefore, when the user uses a large-screen mobile terminal, in a case that a finger is not convenient to touch the fixed virtual keys in a fixed area of the mobile terminal, by applying the technical solutions provided by the disclosure, the functional operations same as the touch of the fixed virtual keys can be implemented very easily by touching the dynamic virtual keys, and thus the user experience of the user is well improved.

At last, it should further be noted that, the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also includes the elements inherent for the process, method, article or device. Unless exclusively limited otherwise, the statement "comprising (including) one . . . " does not exclude the case that other similar elements may exist in the process, method, article or device.

The embodiments of the disclosure are described in a progressive way, and each embodiment emphasizes the differences from other embodiments, and the same or similar contents of the embodiments may be referred to each other. Since the system disclosed by the embodiments corresponds to the method disclosed by the embodiments, the description of the system is brief, and for relevant matters references may be made to the description of the method.

The above description on the disclosed embodiments can enable a person skilled in the art to implement or use the disclosure. Various modifications to these embodiments are obvious for the person skilled in the art. General principles defined herein may be implemented in other embodiments without departing from the spirit or scope of the disclosure. Therefore, the disclosure is not limited to these embodiments herein, but complies with a widest range consistent with the principle and novel characteristics disclosed herein.

What is claimed is:

1. A method for controlling mobile terminal, applied to a mobile terminal with a touch screen, comprising:
    detecting an operation that a user finger clicks a touch screen;
    in a case that the operation that the user finger clicks the touch screen in a preset duration reaches to a preset number of clicks, controlling the touch screen to display a preset quantity of dynamic virtual keys in a preset area, the preset area is an area within a preset range taking a clicking position of the user finger as a center, and the preset quantity of dynamic virtual keys comprising basic dynamic virtual keys corresponding to functional operations of fixed virtual keys, the functional operations of touching the fixed virtual keys are the same functional operations as touching the dynamic virtual keys;
    detecting an operation that the user finger clicks the dynamic virtual keys; and
    responding to the operation that the user finger clicks the dynamic virtual keys and executing functional operations corresponding to the dynamic virtual keys,
    wherein the fixed virtual keys refer to virtual keys arranged in a fixed area of the touch screen;
    in a case that the time that the user finger clicks the dynamic virtual keys is detected to reach a first preset duration, controlling each of the dynamic virtual keys to enter a movable state; obtaining a first operation that the user finger moves the dynamic virtual keys on the touch screen, responding to the first operation, and moving the dynamic virtual keys; in a case that the time that the user finger clicks the dynamic virtual keys is detected to reach a second preset duration, controlling the preset quantity of dynamic virtual keys to simultaneously enter the movable state, the second preset duration is greater than the first preset duration; and obtaining a second operation that the user finger simultaneously moves the preset quantity of dynamic virtual keys on the touch screen, responding to the second operation and simultaneously moving the preset quantity of dynamic virtual keys to positions more conveniently touched by the finger.

2. The method as claimed in claim 1, before the step of controlling the touch screen to display the preset quantity of dynamic virtual keys in the preset area in a case that the operation that the user finger clicks the touch screen in the preset duration reaches to the preset number of clicks, further comprising:
    setting the dynamic virtual keys and functional operations corresponding to the dynamic virtual keys.

3. The method as claimed in claim 2, wherein the preset quantity of dynamic virtual keys further comprise:
    a customized dynamic virtual key corresponding to a functional operation customized by the user.

4. The method as claimed in claim 1, before the step of controlling the touch screen to display the preset quantity of dynamic virtual keys in the preset area in a case that the operation that the user finger clicks the touch screen in the preset duration reaches to the preset number of clicks, further comprising:
    setting a size of the preset area.

5. The method as claimed in claim 1, wherein the preset quantity of dynamic virtual keys further comprise:
    a customized dynamic virtual key corresponding to a functional operation customized by the user.

6. An apparatus for controlling mobile terminal, applied to a mobile terminal with a touch screen, the apparatus has a processor coupled with a memory, and the processor configured to execute programming instructions stored in the memory,
    wherein the processor is configured to detect an operation that a user finger clicks a touch screen;
    control the touch screen to display a preset quantity of dynamic virtual keys in a preset area in a case that the operation that the user finger clicks the touch screen in a preset duration reaches to a preset number of clicks, the preset area is an area within a preset range taking a clicking position of the user finger as a center, and the preset quantity of dynamic virtual keys comprises basic dynamic virtual keys corresponding to functional operations of fixed virtual keys, the functional operations of touching the fixed virtual keys are the same functional operations as touching the dynamic virtual keys, wherein the fixed virtual keys refer to virtual keys arranged in a fixed area of the touch screen;
    detect an operation that the user finger clicks the dynamic virtual keys; and
    respond to the operation that the user finger clicks the dynamic virtual keys and execute functional operations corresponding to the dynamic virtual keys;
    the processor is configured to control each of the dynamic virtual keys to enter a movable state in a case that the time that the user finger clicks the dynamic virtual keys is detected to reach a first preset duration, obtain a first operation that the user finger moves the dynamic virtual keys on the touch screen, respond to the first operation and move the dynamic virtual keys; control the preset quantity of dynamic virtual keys to simultaneously enter the movable state in a case that the time that the user finger clicks the dynamic virtual keys is detected to reach a second preset duration, the second preset duration being greater than the first preset duration; and obtain a second operation that the user finger simultaneously moves the preset quantity of dynamic virtual keys on the touch screen, respond to the second operation and simultaneously move the preset quantity of dynamic virtual keys to positions more conveniently touched by the finger.

7. The apparatus as claimed in claim 6, the programming instructions further comprise:
    setting the dynamic virtual keys and functional operations corresponding to the dynamic virtual keys.

8. The apparatus as claimed in claim 7, wherein the preset quantity of dynamic virtual keys displayed by the touch screen controlled by the second control component in the preset area further comprise:
a customized dynamic virtual key corresponding to a functional operation customized by the user.

9. The apparatus as claimed in claim 6, wherein the processor is configured to set a size of the preset area.

10. The apparatus as claimed in claim 6, wherein the preset quantity of dynamic virtual keys displayed by the touch screen controlled by the second control component in the preset area further comprise:
a customized dynamic virtual key corresponding to a functional operation customized by the user.

11. A mobile terminal, comprising:
a processor and a touch screen;
wherein the processor is configured to:
detect an operation that a user finger clicks a touch screen; in a case that the operation that the user finger clicks the touch screen in a preset duration reaches to a preset number of clicks, control the touch screen to display a preset quantity of dynamic virtual keys in a preset area, the preset area being an area within a preset range taking a clicking position of the user finger as a center, and the preset quantity of dynamic virtual keys comprising basic dynamic virtual keys corresponding to functional operations of fixed virtual keys; detect an operation that the user finger clicks the dynamic virtual keys; and respond to the operation that the user finger clicks the dynamic virtual keys and execute functional operations corresponding to the dynamic virtual keys, functional operations of touching the fixed virtual keys are the same functional operations as touching the dynamic virtual keys, wherein the fixed virtual keys refer to virtual keys arranged in a fixed area of the touch screen;

the processor is further configured to control each of the dynamic virtual keys to enter a movable state in a case that the time that the user finger clicks the dynamic virtual keys is detected to reach a first preset duration, obtain a first operation that the user finger moves the dynamic virtual keys on the touch screen, respond to the first operation and move the dynamic virtual keys; control the preset quantity of dynamic virtual keys to simultaneously enter the movable state in a case that the time that the user finger clicks the dynamic virtual keys is detected to reach a second preset duration, the second preset duration being greater than the first preset duration; and obtain a second operation that the user finger simultaneously moves the preset quantity of dynamic virtual keys on the touch screen, respond to the second operation and simultaneously move the preset quantity of dynamic virtual keys to positions more conveniently touched by the finger.

* * * * *